United States Patent
Kim et al.

(10) Patent No.: US 7,617,323 B2
(45) Date of Patent: Nov. 10, 2009

(54) METHOD FOR SUPPORTING MUTUAL EXCLUSION FUNCTION AND DRM DEVICE THEREOF

(75) Inventors: Hee Jean Kim, Yongin-si (KR); Perumal Raj Sivaradjane, Bangalore (IN); Varinder Pratap Singh, Bangalore (IN); Tae-Chul Jung, Seongnam-si (KR); Maeng Hee Sung, Seoul (KR); Weon Il Jin, Suwon-si (KR); Bae Eun Jung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 224 days.

(21) Appl. No.: 11/898,416

(22) Filed: Sep. 12, 2007

(65) Prior Publication Data

US 2008/0183881 A1 Jul. 31, 2008

(30) Foreign Application Priority Data

Jan. 30, 2007 (KR) .................... 10-2007-0009522

(51) Int. Cl.
*G06F 15/16* (2006.01)
(52) U.S. Cl. ..................................... 709/229; 709/219
(58) Field of Classification Search ......... 709/200–203, 709/217–229
See application file for complete search history.

(56) References Cited

U.S. PATENT DOCUMENTS

| 5,287,444 A * | 2/1994 | Enescu et al. ............... 715/234 |
| 5,692,178 A | 11/1997 | Shaughnessy |
| 2001/0034609 A1* | 10/2001 | Dovolis ........................ 705/1 |
| 2002/0002413 A1 | 1/2002 | Tokue |
| 2002/0065778 A1* | 5/2002 | Bouet et al. ................... 705/57 |
| 2002/0184191 A1* | 12/2002 | Marpe et al. ................... 707/3 |
| 2003/0187860 A1 | 10/2003 | Holland |
| 2003/0217010 A1 | 11/2003 | Stefik et al. |
| 2004/0117490 A1 | 6/2004 | Peterka et al. |
| 2005/0177625 A1* | 8/2005 | Paek et al. ................. 709/219 |

FOREIGN PATENT DOCUMENTS

| KR | 10-2005-0001701 A | 1/2005 |
| KR | 10-2005-0039537 A | 4/2005 |
| KR | 10-2005-0096036 A | 10/2005 |
| KR | 10-2006-0046427 A | 5/2006 |
| WO | WO 2004-044821 A | 5/2004 |
| WO | WO 2005-124606 A | 12/2005 |

OTHER PUBLICATIONS

D. P. Bovet & M. Cesati "Understanding the Linux Kernel" The Virtual Filesystem—File Locking, Chpt. 12; pp. 366-371, O'Reilly, USA 2001, XP002478230.

* cited by examiner

*Primary Examiner*—Moustafa M Meky
(74) *Attorney, Agent, or Firm*—NSIP Law

(57) ABSTRACT

A mutual exclusion method and DRM device is provided. The mutual exclusion method includes receiving an instruction associated with a predetermined stored file from the CE device, checking whether a performing instruction being performed associated with the predetermined stored file exists, and generating a collision error message informing that a collision error has occurred due to the inputted instruction when the performing instruction being performed associated with the predetermined stored file exists.

20 Claims, 4 Drawing Sheets

METHOD FOR SUPPORTING MUTUAL EXCLUSION FUNCTION AND DRM DEVICE THEREOF

CROSS-REFERENCE TO RELATED APPLICATIONS

This application claims the benefit under 35 U.S.C. §119(a) of Korean Patent Application No. 10-2007-0009522, filed on Jan. 30, 2007, in the Korean Intellectual Property Office, the entire disclosure of which is hereby incorporated by reference.

BACKGROUND OF THE INVENTION

1. Field of the Invention

The present invention relates to a mutual exclusion function. More particularly, the present invention relates to a mutual exclusion method on a digital rights management (DRM) device connected to a consumer electronics (CE) device, and a DRM device using the method.

2. Description of Related Art

A mutual exclusion function generally indicates a function which controls to enable only a single process to access a common variable or resource when a plurality of parallel processes access the common variable or resource in order to properly operate the plurality of parallel processes. When a file requiring a digital rights management (DRM) function is accessed by a plurality of users, a consumer electronics (CE) device provides the mutual exclusion function.

The DRM function is to securely protect rights and benefits of a contents service provider, to prevent illegal copying, and support from generation, distribution, and management of contents, such as charging for use of the contents and a payment service for the contents. The DRM function may prevent an unauthorized user from using the contents when the user does not pay the fee for the contents by equipping a security authentication system for individual contents.

A collision error may occur associated with more than two instructions associated with an identical file since the CE device having an embedded operation system (OS) may provide the mutual exclusion function, however a CE device not having the embedded OS may not provide the mutual exclusion function.

Accordingly, there is a need for a new method and system that can variously perform the mutual exclusion function required to support a CE device that does not have an embedded OS.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a mutual exclusion method and a DRM device which can prevent a collision error occurring due to more than two instructions associated with an identical file by determining whether to perform an inputted instruction according to a feature of a performing instruction being performed on a digital rights management (DRM) device connected to a consumer electronics (CE) device.

According to an aspect of exemplary embodiments of the present invention, there is provided a mutual exclusion method on a DRM device connected to a CE device. The method includes receiving an instruction associated with a predetermined stored file from the CE device, checking whether a performing instruction being performed associated with the predetermined stored file exists, and generating a collision error message informing that a collision error has occurred due to the inputted instruction when the performing instruction being performed associated with the predetermined stored file exists.

According to an aspect of exemplary embodiments of the present invention, there is provided a DRM device for connecting to a CE device and including an interface receiving an instruction associated with a predetermined stored file from the CE device, a control module generating a collision error message informing that a collision error has occurred due to the inputted instruction when a performing instruction associated with the predetermined stored file exists, and a DRM module performing a DRM function with respect to an accessed file according to the performing instruction of the control module.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
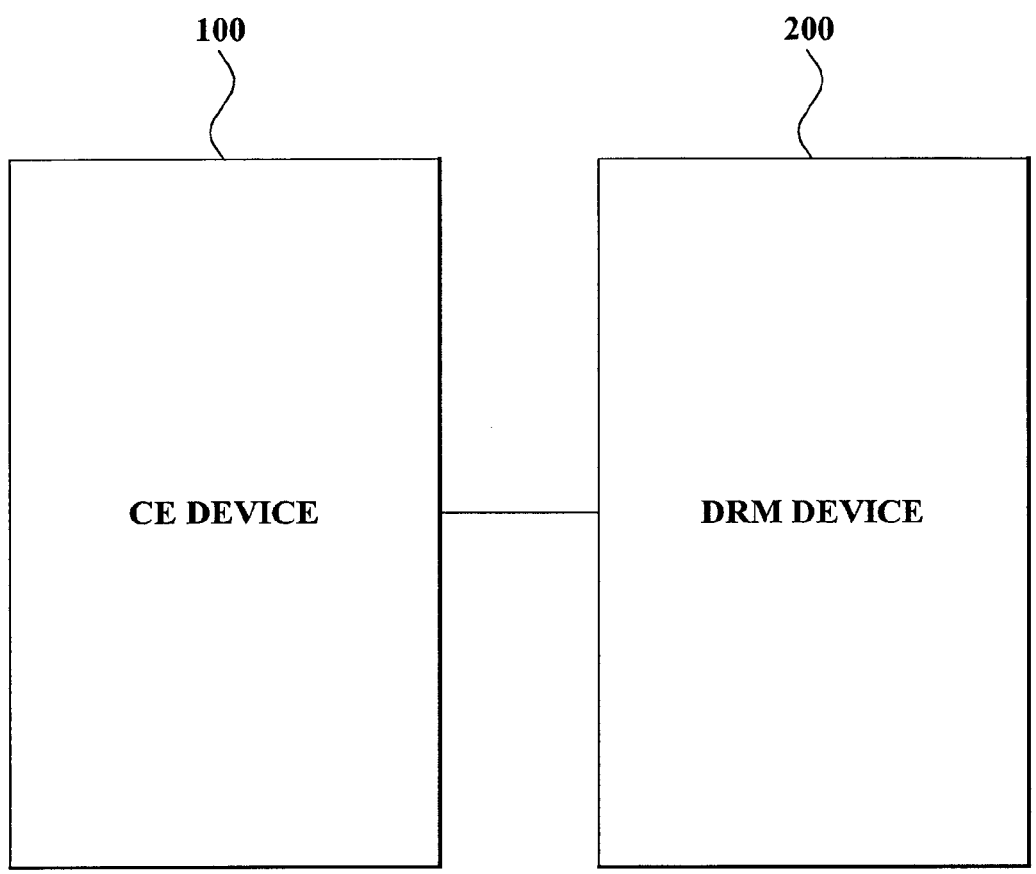
FIG. 1 is a configuration diagram briefly illustrating a system according to an exemplary embodiment of the present invention.

FIG. 1 is a configuration diagram briefly illustrating a system according to an exemplary embodiment of the present invention.

As illustrated in FIG. 1, the system according to the exemplary embodiment of the present invention may include a consumer electronics (CE) device 100, and a digital rights management (DRM) device 200 being connected to the CE device 100 to perform a mutual exclusion function.

The CE device 100 may include various electronic devices such as a set top box (STB), a personal computer (PC), a notebook, a personal digital assistant (PDA), and a mobile communication terminal.

The DRM device 200 may perform a DRM function, may be detachably connected to the CE device 100 via a wired interface such as a universal serial bus (USB) port, and may be connected to the various electronic devices to be utilized via a wireless interface such as Bluetooth.

In addition to the CE device 100 where the DRM device 200 is directly connected, the DRM device 200 may be indirectly connected to be utilized for various electronic devices via a wired/wireless network.

For example, the DRM device 200 may be embodied as a smart card type such as a Subscriber Identity Module (SIM) card, a Removable User Identity Module (R-UIM) card, and a Universal Subscriber Identity Module (USIM) card.

Figure 2:
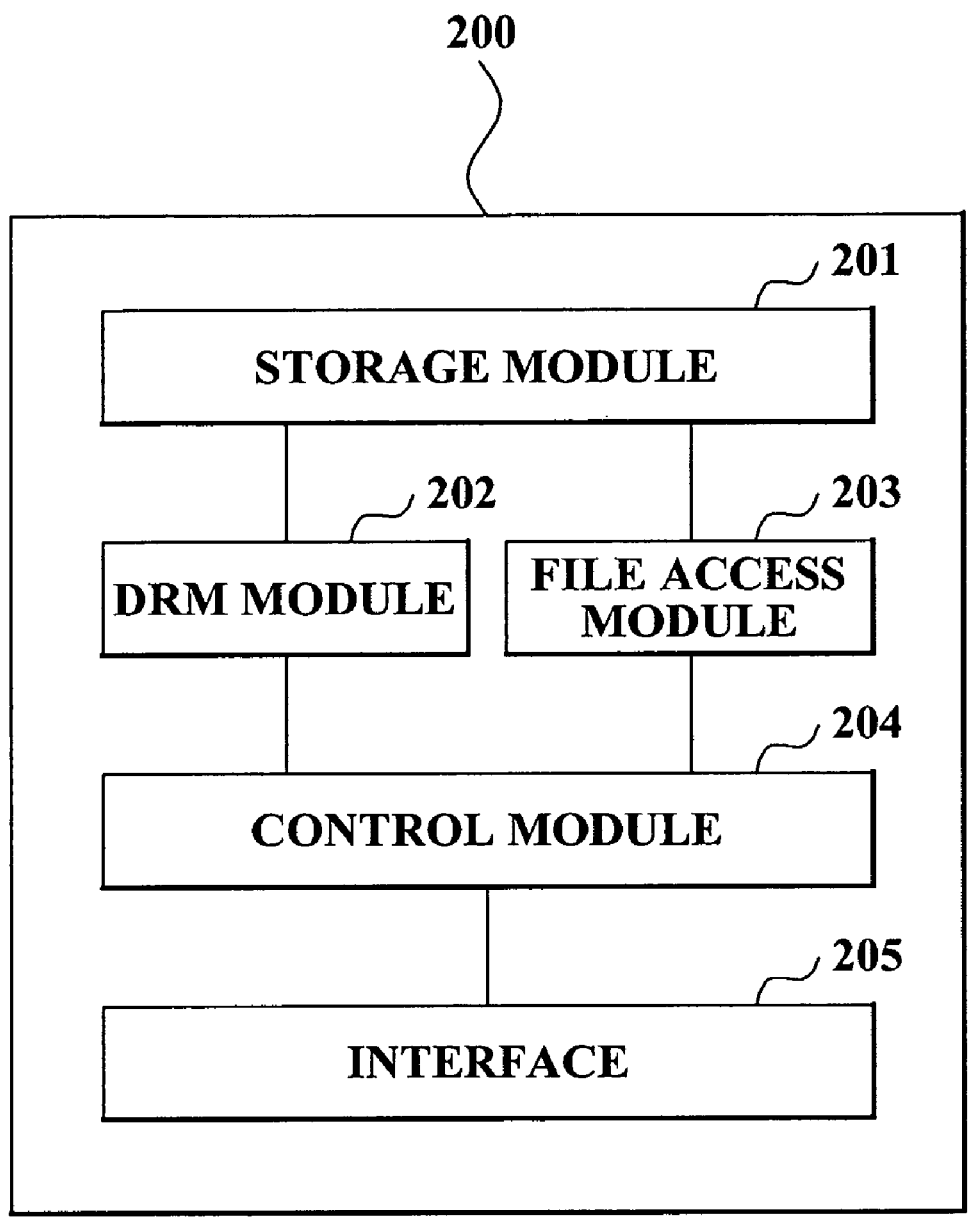
FIG. 2 is a configuration diagram illustrating a DRM device performing a mutual exclusion function according to an exemplary embodiment of the present invention.

FIG. 2 is a configuration diagram illustrating a DRM device performing a mutual exclusion function according to an exemplary embodiment of the present invention.

As described in FIG. 2, the DRM device 200 may include a storage module 201, a DRM module 202, a file access module 203, a control module 204, and an interface 205.

The storage module 201 may store at least one file. The file access module 203 may access the storage module 201 according to a performing instruction of the control module 204 to access the stored at least one file, and the DRM module 202 may perform a DRM function with respect to the at least one stored file, having been accessed according to the performing instruction of the control module 204.

The interface 205 receives an instruction associated with a predetermined stored file from a CE device to output the inputted instruction to the control module 204. The control module 204 may generate a collision error message informing that a collision error has occurred due to the inputted instruction when the performing instruction associated with the predetermined stored file exists.

The control module 204 may check whether the inputted instruction and the performing instruction are included in a collision list when the performing instruction associated with the at least one stored file exists, and may generate a collision error message informing that a collision error has occurred due to the inputted instruction when the inputted instruction and the performing instruction are included in the collision list.

Figure 3:
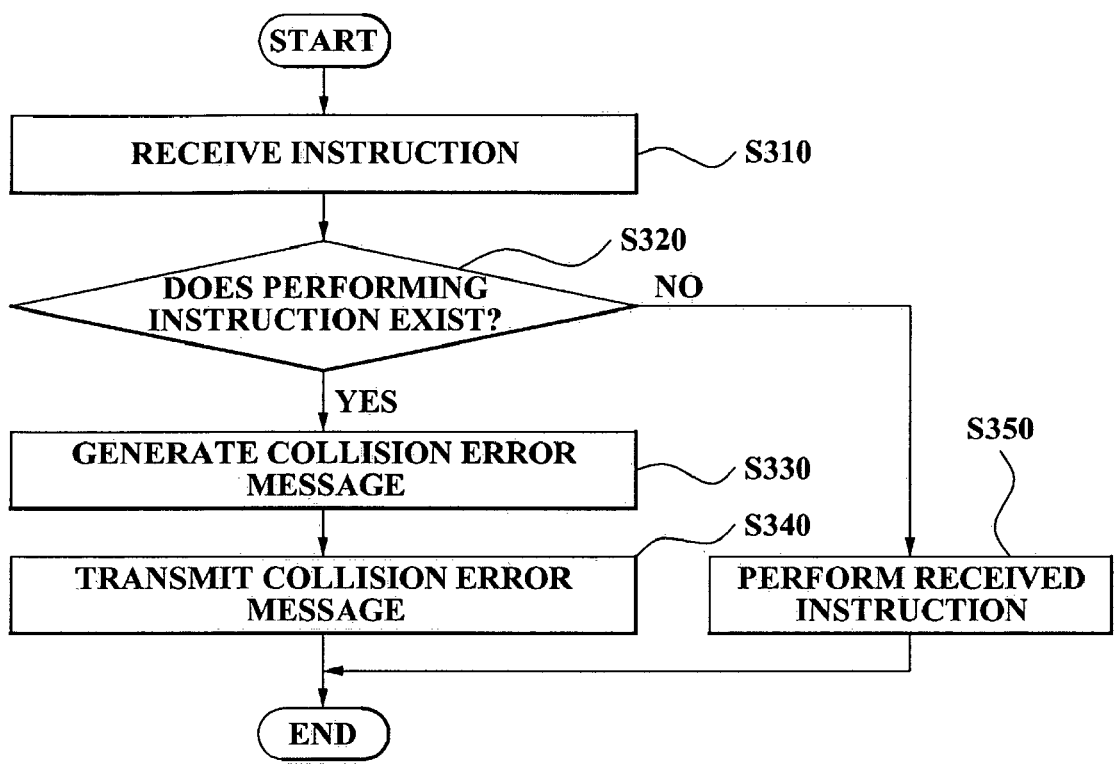
FIG. 3 is a flowchart illustrating a mutual exclusion function performing method according to an exemplary embodiment of the present invention.

FIG. 3 is a flowchart illustrating a mutual exclusion function performing method according to an exemplary embodiment of the present invention.

As illustrated in FIG. 3, the mutual exclusion function performing method according to the exemplary embodiment of the present invention may include step S310 of receiving an instruction associated with a predetermined stored file, step S320 of checking whether a performing instruction being performed associated with the predetermined stored file exists, step S330 of generating a collision error message, step S340 of transmitting the collision error message, and step S350 of performing the inputted instruction.

Hereinafter, the mutual exclusion function performing method according to the exemplary embodiment of the present invention will be described.

The DRM device 200 of FIG. 2 may receive the instruction associated with the predetermined stored file from the CE device 100 of FIG. 1. In an exemplary implementation, the instruction is to access the predetermined stored file, and may include any one of a read, a write, a modify, and a delete instruction.

In an exemplary implementation, the DRM device 200 may perform a mutual exclusion function by itself to be compatible with CE devices having an embedded OS or without the embedded OS.

In step 320, the interface 205 of FIG. 2 receives the instruction associated with the predetermined stored file from the CE device 100 of FIG. 1 to output the inputted instruction to the control module 204 of FIG. 2, and the control module 204 checks whether the performing instruction associated with the predetermined stored file exists.

The control module 204 generates the collision error message informing that a collision error has occurred due to the inputted instruction when the performing instruction associated with the predetermined stored file exists in step S330, and the interface 205 transmits the collision error message to the CE device 100 in step S340.

The control module 204 performs the inputted instruction when the performing instruction associated with the predetermined stored file does not exist in step S350.

For example, when user A is performing a read instruction associated with a predetermined stored file, and when user B inputs a read instruction associated with the predetermined stored file, the control module 204 may not perform the inputted instruction since the inputted instruction and the performing instruction are associated with the identical predetermined stored file.

The file access module 203 of FIG. 2 accesses a corresponding file among the predetermined stored file according to the performing instruction of the control module 204, and the DRM module 202 may perform the DRM function with respect to the accessed file.

Subsequently, the DRM device 200 of FIG. 2 may process an appropriate file, which is verified via the DRM function, according to the inputted instruction. Specifically, the DRM module 202 decodes audio files protected by the DRM function to output the decoded audio files to speakers or earphones of the CE device 100, or decodes video or text files to display the decoded video or text files via a display module of the CE device 100.

As described above, the mutual exclusion function performing method according to the exemplary embodiment of the present invention may prevent a collision from occurring due to instructions associated with an identical file, and also may prevent a plurality of users from simultaneously reading and playing the identical file. To enable simultaneous reading of the identical file, a mutual exclusion function performing method according to another exemplary embodiment of the present invention will be described by referring to FIG. 4.

Figure 4:
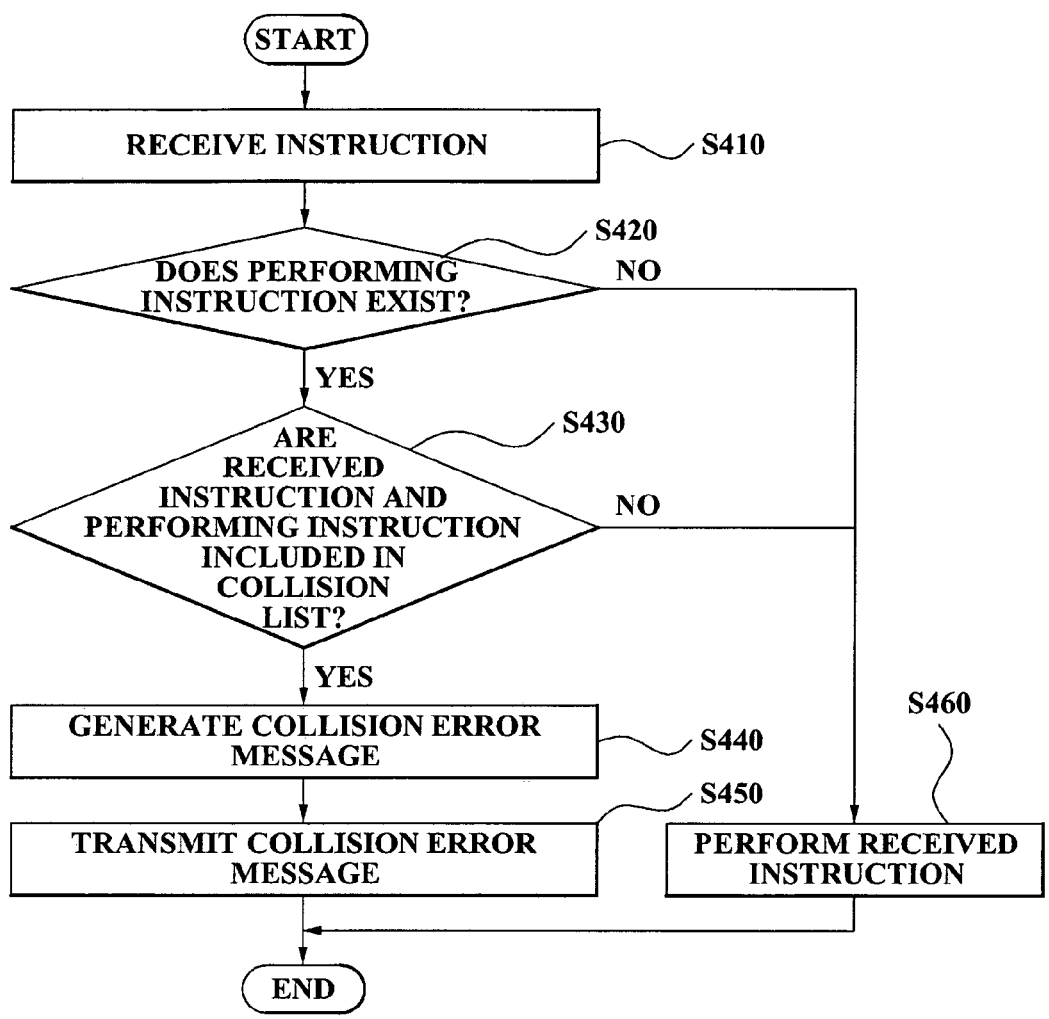
FIG. 4 is a flowchart illustrating a mutual exclusion function performing method according to another exemplary embodiment of the present invention.

FIG. 4 is a flowchart illustrating a mutual exclusion function performing method according to another exemplary embodiment of the present invention.

As illustrated in FIG. 4, the mutual exclusion function performing method according to the other exemplary embodiment of the present invention may include step S410 of receiving an instruction associated with a predetermined file, step S420 of checking whether a performing instruction being performed exists, step S430 of checking whether the inputted instruction and the performing instruction are included in a collision list, step S440 of generating a collision error message, step S450 of transmitting the collision error message, and step S460 of performing the inputted instruction.

The interface 205 of FIG. 2 receives the instruction associated with the predetermined file to output the inputted instruction to the control module 204 in step S410. The control module 204 checks whether the performing instruction being performed associated with the predetermined stored file exists in step S420.

The control module 204 checks whether the inputted instruction and the performing instruction are included in the predetermined collision list in step S430. In an exemplary implementation, the predetermined collision list may include instructions having a probability that a collision error may occur when the instructions are simultaneously performed on an identical file. As an example, the predetermined collision list may include a read and write, a read and modify, and a read and delete instructions. The control module 204 performs the inputted instruction when the performing instruction associated with the predetermined stored file does not exist in step S460. The control module 204 generates the collision error message informing that a collision error has occurred due to the inputted instruction when the inputted instruction and the performing instruction are included in the collision list in step S440. The interface 205 transmits the generated collision error message to the CE device 100 of FIG. 1 in step S450.

Also, the control module 204 performs the inputted instruction when inputted instruction and the performing instruction are not included in the collision list in step S460.

For example, when user A is performing a read instruction associated with a predetermined stored file, and when user B inputs a read instruction associated with the predetermined stored file, the control module 204 may perform both of the read instructions since even though the inputted instruction and the performing instruction are associated with the identical predetermined stored file, the inputted instruction and the performing instruction are not included in a collision list.

Conversely, when user A is performing a read instruction associated with a predetermined stored file, and when user B inputs a delete instruction associated with the predetermined stored file, the control module 204 may not perform the delete instruction.

The mutual exclusion method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to exemplary embodiments of the present invention, there is provided a mutual exclusion method and DRM device which may prevent a collision error occurring due to more than two instructions associated with an identical file by determining whether to perform an inputted instruction according to a feature of a performing instruction being performed on a DRM device connected to a CE device.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A mutual exclusion method on a digital rights management (DRM) device connected to a consumer electronics (CE) device, the method comprising:
   receiving an instruction associated with a predetermined stored file from the CE device;
   checking whether a performing instruction being performed associated with the predetermined stored file exists; and
   generating a collision error message informing that a collision error has occurred due to the inputted instruction when the performing instruction being performed associated with the predetermined stored file exists.

2. The method of claim 1, wherein the performing instruction operates to access the predetermined stored file, and comprises any one of a read, a write, a modify, and a delete instruction.

3. The method of claim 1, further comprising:
   performing the inputted instruction when the performing instruction associated with the predetermined stored file does not exist.

4. The method of claim 1, further comprising:
   decoding the predetermined stored file associated with the inputted instruction such that the inputted instruction is performed to output the decoded file.

5. The method of claim 1, further comprising:
   checking whether the inputted instruction and the performing instruction are included in a predetermined collision list when the performing instruction associated with the predetermined stored file exists;
   generating the collision error message informing that the collision error has occurred due to the inputted instruction when the inputted instruction and the performing instruction are included in the collision list.

6. The method of claim 5, wherein the collision list includes instructions having a probability that a collision error may occur when the instructions are simultaneously performed on an identical file.

7. The method of claim 5, further comprising:
   performing the inputted instruction when the inputted instruction and the execution instruction are not included in the collision list.

8. The method of claim 7, further comprising:
   decoding the file associated with the inputted instruction such that the inputted instruction is performed to output the decoded file.

9. The method of claim 1, further comprising:
   transmitting the generated collision error message to the CE device.

10. A computer-readable medium of computer executable instructions for controlling a digital rights management (DRM) device connected to a consumer electronics (CE) device, comprising:
    a first set of instructions for controlling an interface of the DRM device to receive an instruction associated with a predetermined stored file from the CE device;
    a second set of instructions for controlling a control module of the DRM device to check whether a performing instruction being performed associated with the predetermined stored file exists; and a third set of instructions for controlling a DRM module of the DRM device to generate a collision error message informing that a collision error occurred due to the inputted instruction when the performing instruction being performed associated with the predetermined stored file exists.

11. A DRM device for being connected to a consumer electronics (CE) device, the device comprising:

an interface for receiving an instruction associated with a predetermined stored file from the CE device;

a control module generating a collision error message informing that a collision error occurred due to the inputted instruction when a performing instruction associated with the predetermined stored file exists; and a DRM module performing a DRM function with respect to an accessed file according to the performing instruction of the control module.

12. The DRM device of claim 11, wherein the instruction operates to access the predetermined stored file, and comprises any one of a read, a write, a modify, and a delete instruction.

13. The DRM device of claim 11, wherein the control module performs the inputted instruction when the performing instruction associated with the predetermined stored file does not exist.

14. The DRM device of claim 11, wherein the DRM module decodes a file associated with the inputted instruction such that the inputted instruction is performed to output the decoded file.

15. The DRM device of claim 11, wherein the control module checks whether the inputted instruction and the performing instruction are included in a predetermined collision list when the performing instruction associated with the predetermined stored file exists, and generates the collision error message informing that the collision error occurred due to the inputted instruction when the inputted instruction and the performing instruction are included in the collision list.

16. The DRM device of claim 15, wherein the control module performs the inputted instruction when the inputted instruction and the performing instruction are not included in the collision list.

17. The DRM device of claim 16, wherein the DRM module decodes the file associated with the inputted instruction such that the inputted instruction is performed to output the decoded file.

18. The DRM device of claim 16, wherein the collision list includes instructions having a probability that a collision error may occur when the instructions are simultaneously performed on an identical file.

19. The DRM device of claim 11, further comprising:

a storage module storing at least one file to manage; and a file access module for accessing to the storage module according to the performing instruction of the control module to access the predetermined stored file.

20. The DRM device of claim 11, wherein the DRM device is detachable from the CE device, and is embodied as a smart card capable of storing multimedia information.

* * * * *